Sept. 12, 1961 C. DE GANAHL 2,999,608
BALED HAY STACKER
Filed July 27, 1959 3 Sheets-Sheet 1

FIG.I.

INVENTOR.
CHARLES de GANAHL
BY
ATTORNEYS

Sept. 12, 1961    C. DE GANAHL    2,999,608
BALED HAY STACKER
Filed July 27, 1959    3 Sheets-Sheet 2

INVENTOR.
CHARLES de GANAHL
BY
McGrew and Edwards
ATTORNEYS

Sept. 12, 1961 C. DE GANAHL 2,999,608
BALED HAY STACKER
Filed July 27, 1959 3 Sheets-Sheet 3

INVENTOR.
CHARLES de GANAHL
BY
ATTORNEYS

United States Patent Office 2,999,608
Patented Sept. 12, 1961

2,999,608
BALED HAY STACKER
Charles de Ganahl, Box 75, Yampa, Colo.
Filed July 27, 1959, Ser. No. 829,704
9 Claims. (Cl. 214—654)

This invention relates to baled hay stackers and more particularly to stacker attachments for tractors and the like to provide a mobile, baled hay pickup and stacker arranged to pickup and elevate a plurality of bales of hay onto a stack.

In one haying method, after standing hay is cut, furrowed and cured, it is then baled into generally rectangular bales. The bales, after passing through a baler, are merely dropped on the ground. Subsequently such bales are picked up and stacked for storage. Such method has required at least one worker (called a stacker) on the stack to place the bales in proper orientation, that is, with the bales in successive layers overlapping two bales in the next lower row to produce a self-sustaining stack. Since the bales are relatively heavy, the stacker's job entails considerable amount of work, and, further, at least one worker is required to operate the elevating mechanism for lifting the bales to the stacker.

According to the present invention I have provided a mechanism for attachment to a tractor or the like, utilizing a front end loader and elevator whereby a plurality of bales, stacked in multiple layers in overlapping position may be picked up, elevated and discharged in proper position onto the stack. The attachment includes a plurality of extensible teeth which pick up a load, support it for transportation to the stack, and then raise the load to proper level. A clamp is provided for holding the stacked bales on the extensible teeth, and additional means are provided for discharging the bales from the elevator.

Included among the objects and advantages of the present invention is an elevating and baled hay supporting attachment for a tractor which provides means for picking up a small stack or load of baled hay and placing it in position on a larger storage stack. The stacking attachment includes extensible teeth which permit easy pickup and discharge of baled hay and provides means for discharging such baled hay in proper position on a storage stack. Clamping means are provided for the elevating mechanism for maintaining the small stacks of baled hay in position from their pickup to their discharge on a hay stack, and means are provided for discharge of a load of baled hay in proper position on a storage stack.

These and other objects and advantages of the invention may be readily ascertained by referring to the following description and appended drawings in which.

Figure 1:
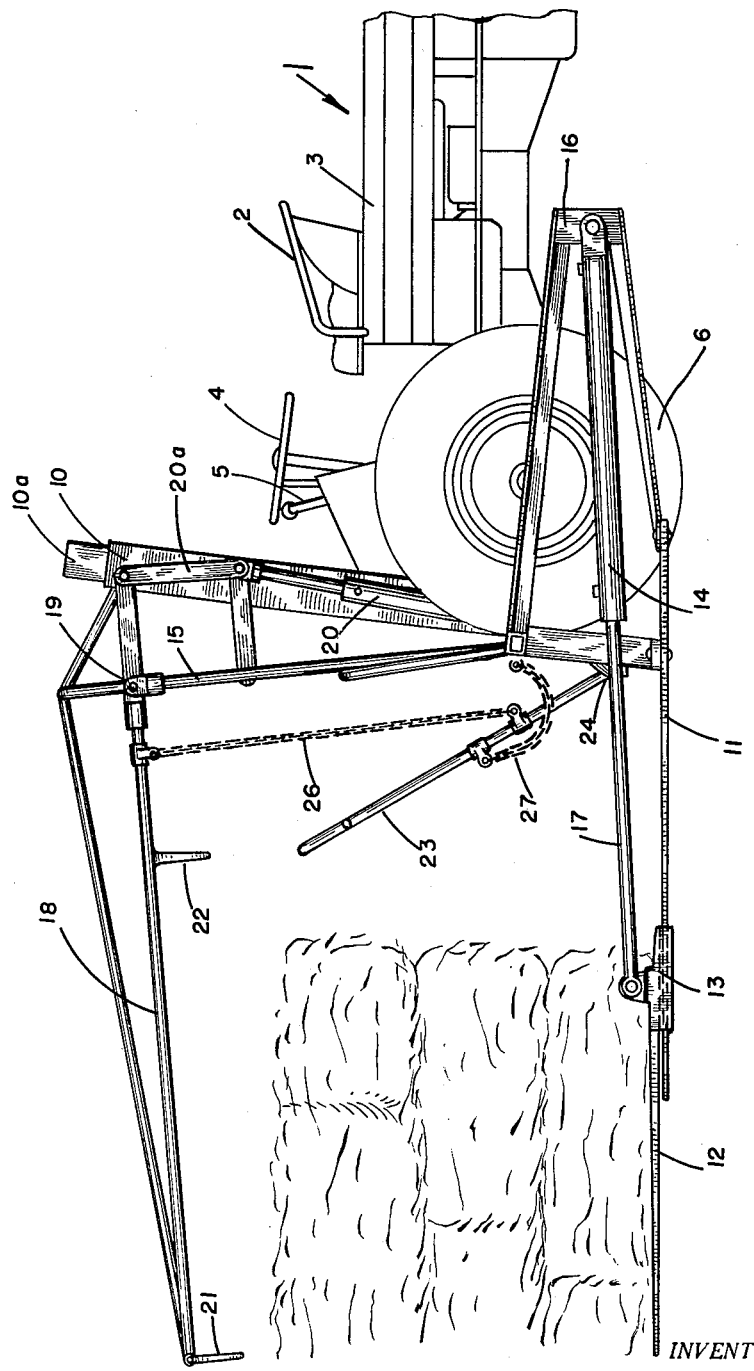
FIG. 1 is a side elevational view of an attachment for a tractor according to the invention.
Figure 2:
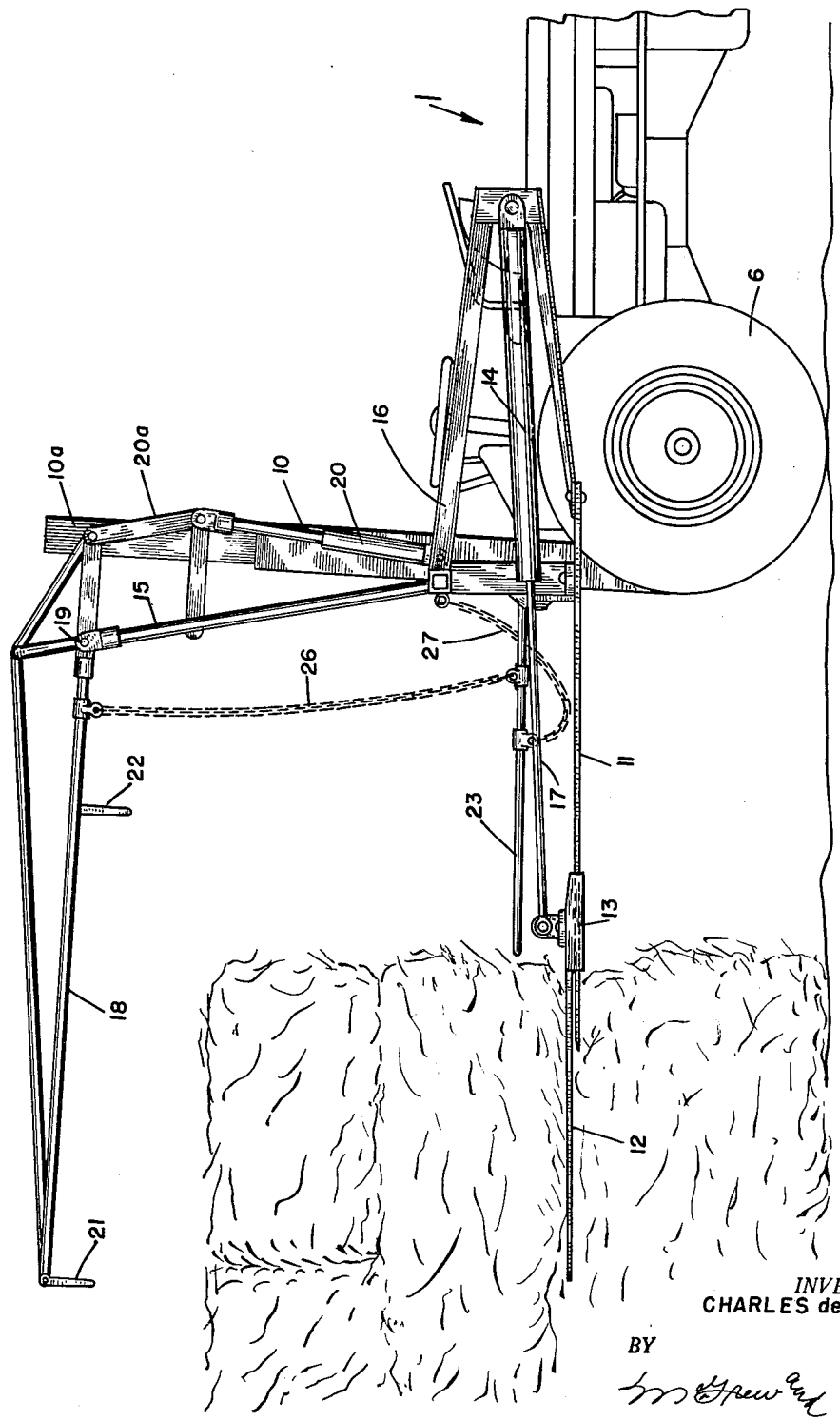
FIG. 2 is a side elevational view of an attachment according to the invention in stack discharge position.
Figures 3, 4:
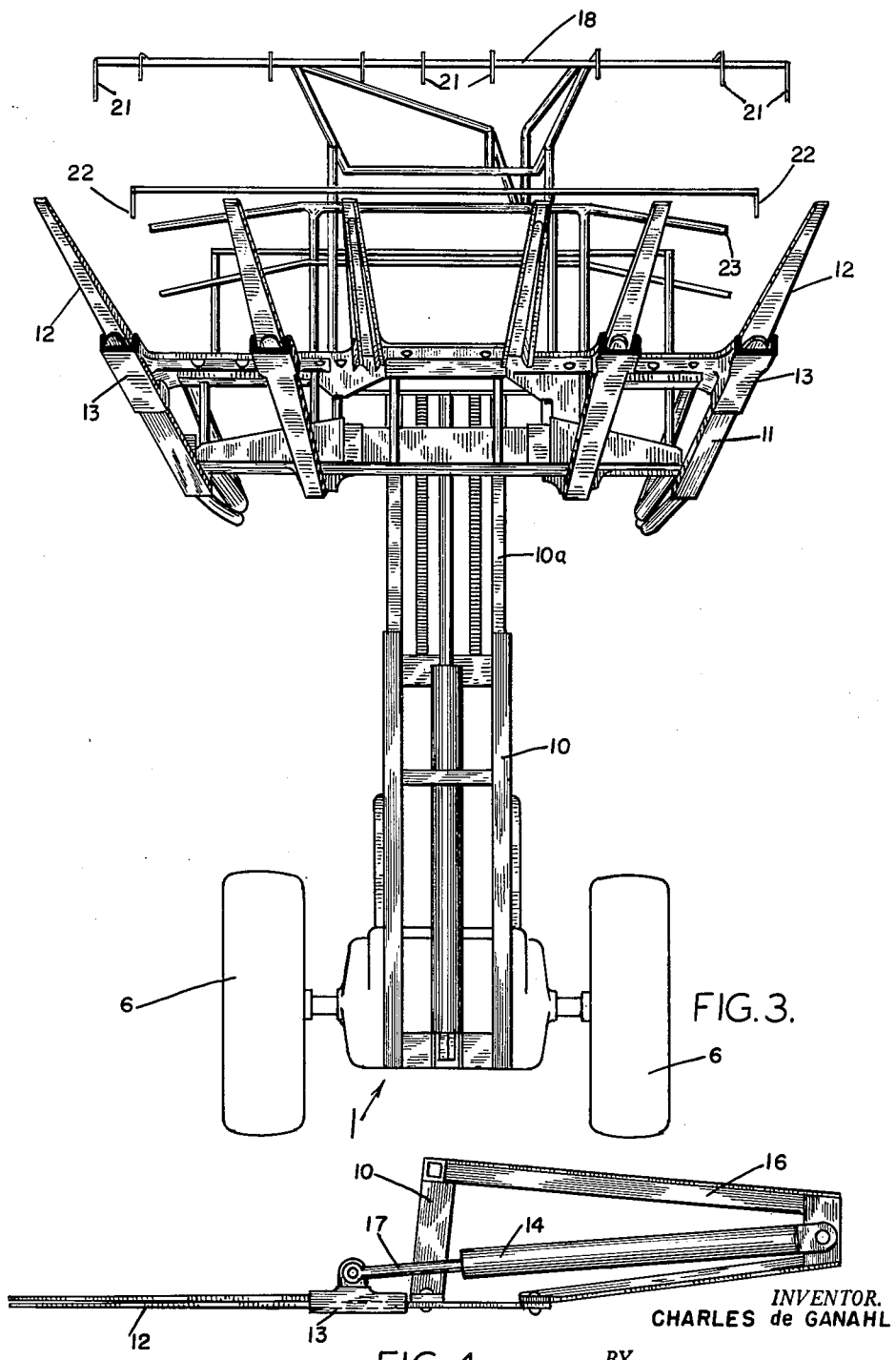
FIG. 3 is a front elevational view of the stacker according to the invention with the elevating mechanism raised.
FIG. 4 is an enlarged detail of extensible teeth of the elevating section of the invention.

In the device illustrated a tractor, shown in general by numeral 1, is of the type arranged for either forward or rearward positioning of the operator. In this case, the tractor is arranged for rearward operation, and a seat 2 is placed on an engine cowling 3 in a rearward position with a steering mechanism 4 and power or hydraulic controls 5 placed for easy access by the operator. In this position large pneumatic wheels 6 provide supports for the elevating section. In this position the front wheels, not shown, steer the tractor in normal operation, and the engine of the tractor helps to counterbalance the added weight of material lifted on the forklift or elevating mechanism.

The lift mechanism attached to the tractor includes a pair of masts or upright members 10, mounted on a series of telescoping and extensible members 10a, supporting a plurality of teeth 11 extending in an opposed direction from the tractor and mounted so as to move up and down with the members 10. The members 10a permit the upright 10 and the teeth 11 to be raised higher than the height of masts 10, as is a well known expedient in the lift truck art. Teeth 11 provide in effect an elevating platform. Extensible teeth members 12 mounted on slides 13 are arranged for reciprocal movement on the elevating teeth 11. A power cylinder 14 is mounted on a support 16 which in turn is mounted on the upright member 10 for movement therewith. A piston rod 17 for the cylinder 14 is interconnected with the slide 13 and provides means for movement of the slide and the extensible teeth back and forth along the elevating teeth 11. It is to be understood that such a cylinder system is secured to each side of the tractor. An overhead clamp member 18 is pivotally mounted by pins 19 on the upright rod 15 and a pair of cylinders 20 through linkage system 20a provide means for pivoting the clamp 18 around the pivot pins 19. A plurality of tines 21 at the forward end of the clamp 18 and a rearward set of tines 22 provides means for clamping a load of baled hay carried on the teeth. A pusher bar 23 is pivotally mounted at 24 on the framework by member 10, and a chain 26 interconnects the bar with the clamp 18. A stop chain 27 interconnected between bar 23 and the member 10 limits down travel of the holder 23.

In operation, bales of hay which are scattered around the hay field after discharge from the baler are picked up and stacked in small stacks of two or three layers in lapping position. For example, with a common size farm tractor the bales may be stacked in three layers to provide a load of thirty bales which are easily picked up, transported and elevated to the stack. When making the small stacks, the bales in the individual layers are oriented so as to overlap two bales in the next lower layer. By so orienting the bales a stable stack may be made. These smaller stacks are collected and placed in one or more large storage stacks which may be many layers of bales high. For gathering the small stacks, the operator approaches such a stack with the teeth 12 fully extended and with the clamp 18 and pusher bar 23 raised. Since the stack of bales is resting on the ground, the teeth 12 are generally rested on the ground. As shown in FIG. 1, the teeth 12 are pushed under the stack until the load is completely on the teeth, at about the slide 13. The pressure on the cylinders 14 is released, and the tractor is moved forward so that the teeth 12 slide back along the teeth 11. As the tractor is driven into the load, the stack pushes against the bar 23 which is folded back against the mask 10. When the teeth 12 are at their fully retracted position, the clamp 18 is lowered by extending cylinders 20 to push the tines into the hay and hold the bales in the load on the teeth.

With the clamp securely in position holding a load on the lift tines, the operator raises the load off the ground by causing movement of the lift tines and related structure up the mast, and then moves to the main storage stack. At the storage stack the lift is raised to the height necessary to place the load on top of the stack. The operator then maneuvers the load to the position it will rest on the storage stack and the cylinders 14 are actuated to extend the teeth 12 and the carried load. When the load is in proper position the elevator is lowered so that the bales of the load rest on the top of the stack. The clamp is raised free of the hay and the pusher bar is permitted to move to its lowest position. The extensible teeth 12 are withdrawn from the load back along teeth 11. In this position the pusher bar 23 rests against the load preventing it from retracting with teeth 12 thus leaving the load resting in position on the stack. The operator, after removal of the teeth from the load, may return to pick up another load for stacking.

In discharging the load from the stacker, the operator may place the load on the stack with the teeth in retracted position holdling the load against the mast. From this position the tractor is moved away from the stack extending the teeth then under the load. At this point the pusher bar will drop and will hold the load in position on the stack as the extensible teeth are withdrawn from under the load. The cylinders on the assembly are preferably double acting cylinders in order to provide positive action of the extensible members at all times.

While the invention has been described in relation to a particular embodiment, there is no intention to limit the spirt or the scope to the precise details so set forth, except insofar as is described in the following claims.

I claim:

1. A mobile, baled-hay stacker comprising in combination with a self-propelled tractor, an elevator mounted on such a tractor, said elevator including a series of forwardly extending, elongated tines arranged to be moved from ground resting position to an elevated position, a series of extensible tines reciprocally mounted on said elongated tines lying in the same general plane as said tines in position to support a hay load in an extended position forwardly of said elevating tines, means for advancing and retracting said extensible tines, clamp means juxtaposed above said tines and arranged to move into clamping position on a carried load, means for raising and lowering said forwardly extending tines, and a pusher bar pivotally mounted on and adjacent the bottom portion of said elevator in position to pivot downwardly to bear against a load carried in extended position to prevent retraction of the load on retraction of the extensible tines.

2. A mobile, baled-hay stacker comprising in combination with a self-propelled tractor, an elevator mounted on such a tractor, said elevator including a series of forwardly extending, elongated tines arranged to be moved from ground resting position to an elevated position, a series of extensible tines reciprocally mounted on said elongated tines on said elevator in position to support a hay load in extended position forwardly of said elevating tines, means for advancing and retracting said extensible tines, clamp means inclusive of downwardly directed hay engaging teeth juxtaposed above said tines and arranged to move into clamping position on a carried load, means for raising and lowering said forwardly extending tines, and a pusher bar pivotally mounted on said elevator in position above the plane of said extensible tines to pivot downwardly to bear against a load carried in extended position to prevent retraction of the load on retraction of the extensible tines.

3. A stacker according to claim 2 in which the pusher bar is interconnected to said clamp means whereby movement of said clamp means provides movement of said pusher bar.

4. A stacker according to claim 2 in which said pusher bar is pivotally connected to said elevator in about the plane of said forwardly extending tines whereby to pivot downwardly and bear against the bottom of a carried load.

5. A mobile, baled-hay stacker comprising in combination with a self-propelled tractor, a fork-lift elevator mounted on a tractor, said elevator including a series of forwardly extending, elongated tines arranged to be moved from ground resting position to an elevated position, a series of extensible tines reciprocally mounted on said elongated tines on said elevator and lying in the same general plane as said tines in position to support a hay load in extended position forwardly of said elevating tines, power cylinder means for advancing and retracting said extensible tines, clamp means inclusive of at least two downwardly extending rigid series of teeth juxtaposed above said tines and arranged to move into a firm clamping position on a carried load, and a push bar pivotally mounted on said elevator in position to pivot downwardly to bear against a load carried in extended position to prevent retraction of the load on retraction of the extensible tines.

6. A mobile, baled-hay stacker comprising in combination with a self-propelled tractor, an elevator including a telescoping mast and a plurality of extending, elongated tines mounted on said telescoping mast and arranged to move from a ground supported position to an elevated position, means for moving said tines upwardly and downwardly with said mast, a plurality of hay supporting tines mounted on said extending tines arranged for extensible movements therealong so as to support a hay load in position above said extending tines and in extensible position therebeyond, means for advancing and retracting said extensible tines on said extending tines, a clamp mounted on said mast, means for moving said clamp into engaging position with a carried load and thereby hold said load on said tines, and means arranged to contact a carried load on extended tines above the plane of said tines to prevent movement of said load on retraction of said tines from beneath said load.

7. A mobile, baled-hay stacker comprising in combination with a self-propelled tractor, an elevator including a telescoping mast and a plurality of extending, elongated tines mounted on said telescoping mast and arranged to move from a ground supported position to an elevated position, means for moving said tines upwardly and downwardly with said mast, a mount reciprocably carried on each said extending tine, a hay supporting tine mounted on each said mount and arranged for movement with said mount so as to support a hay load in position above said extending tines and in extensible position forwardly thereof, means for advancing and retracting said mounts, a clamp mounted on said mast above said extending tines, means for moving said clamp into engaging position with a load carried adjacent said mast and thereby hold said load on said tines, and means arranged to contact a carried load on the extended tines above the plane of said tines to prevent movement of said load on retraction of said tines from beneath said load.

8. A stacker according to claim 7 in which the clamp includes forward and rearward hay engaging teeth arranged to maintain a carried load substantially intact.

9. A stacker according to claim 7 in which the means for contacting a carried load includes a pusher bar pivotally mounted on the mast adjacent said extending tines so as to bear against the bottom of a carried load above the plane of said tines.

References Cited in the file of this patent
UNITED STATES PATENTS

| | | |
|---|---|---|
| 2,323,605 | Johnson | July 6, 1943 |
| 2,372,870 | Willrodt | Apr. 3, 1945 |
| 2,619,241 | Jessen | Nov. 25, 1952 |
| 2,633,260 | Sutherland | Mar. 31, 1953 |